(12) United States Patent
Hoshino (10) Patent No.: US 6,606,759 B1
(45) Date of Patent: Aug. 19, 2003

(54) WIPER DEVICE

(75) Inventor: Takashi Hoshino, Isesaki (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 09/520,804

(22) Filed: Mar. 8, 2000

(30) Foreign Application Priority Data

Mar. 8, 1999 (JP) .......................................... 11-060197

(51) Int. Cl.$^7$ ............................. B60S 1/34; B60S 1/32; B60S 1/36
(52) U.S. Cl. ................................ 15/250.21; 15/250.351
(58) Field of Search ....................... 15/250.21, 250.351, 15/250.352, 250.23, 250.001, 250.201

(56) References Cited

U.S. PATENT DOCUMENTS 6,119,301 A * 9/2000 Nakatsukasa et al. .... 15/250.21

FOREIGN PATENT DOCUMENTS

| EP | 0182123 | * | 5/1986 | ............... 15/250.21 |
| EP | 0537059 | * | 4/1993 | ............... 15/250.21 |
| JP | 0161238 | * | 8/1985 | ............ 15/250.351 |
| JP | A-62-286861 | | 12/1987 | |
| JP | A-8-72676 | | 3/1996 | |
| JP | A-10-507143 | | 7/1998 | |
| JP | 10-507143 | * | 7/1998 | ............... 15/250.21 |

\* cited by examiner

*Primary Examiner*—Gary K. Graham
(74) *Attorney, Agent, or Firm*—Oliff & Berridge, PLC (57) ABSTRACT

A wiper device has an arm support constituting a wiper arm that is provided with a waterproof structure. The waterproof structure protects a link coupling portion of the arm support from water. First and second link coupling portions are provided on a proximal end portion of the arm support. First and second guiding passages are formed between the first and second link coupling portions, and a third guiding passage is formed above the second link coupling portion. Furthermore, locking hooks for mounting a cover that serve also as dripping guide members are provided and disposed at right ends of the first, second, and third guiding passages such that the locking hooks face each other. Thus, water on a surface of the arm support is positively drained toward a window surface.

20 Claims, 9 Drawing Sheets

WIPER DEVICE

BACKGROUND OF THE INVENTION

1. Field of Invention

The present invention relates to a technological field of a wiper arm in a wiper device for wiping a window surface of a vehicle, such as a passenger car, a bus, or a truck.

2. Description of Related Art

In general, some of this type of wiper devices have a link pivotally coupled to an arm support, which constitutes a wiper arm, as disclosed in, for example, JP-A-10-507143, in order to secure a largest possible area that can be wiped by a blade. Such a wiper device is required to have a waterproof structure to ensure a smooth circular motion of a portion, where the link is pivotally coupled to the arm support, and also to provide protection against abnormal wear or corrosion. For this purpose, it has been proposed to provide the arm support with a cover to cover the link portion where the link is pivotally coupled (hereinafter referred simply as "the link coupling portion".

When the wiper arm moves to an upper reversal position, rainwater wiped by a blade is pushed together with the blade toward the upper reversal position and drops along the blade. The dropping rainwater flows further toward the arm support as the wiper arm further approaches the upper reversal position. As a result, the arm support is subjected to the rainwater that runs along the blade to a distal end of the wiper arm, namely, an arm piece, and the rainwater enters the cover to reach the link coupling portion, presenting a problem of adversely affecting durability or the like of the link coupling portion. A solution to this problem has been an object of the present invention. Furthermore, in a wiper device wherein a wider cover is attached to the arm support, there has been a problem in that the cover is prone to flex in a direction orthogonal to the arm support and come off. A solution to this problem has been another object of the present invention.

SUMMARY OF THE INVENTION

Accordingly, the present invention has been created with a view toward solving the problems described above.

According to one aspect of the present invention, there is provided a wiper device having an arm support constituting a wiper arm and a cover that covers the arm support partly or entirely, wherein at least one of the arm support and the cover is provided with a guiding means for guiding water that has entered between the arm support and the cover.

Thus, water running on a surface of the arm support can be positively drained to outside.

In the arm support according to the present invention, the link for the wiper arm to perform a wiping swing motion can be pivotally connected, and the guiding means can be constructed by at least one of a guiding passage for guiding water on the front surface of the arm support to avoid the link coupling portion, and a dripping guide member that guides the water on the front surface of the arm support to a rear surface thereof, thus making it possible to protect the link coupling portion from water.

The dripping guide member in accordance with the present invention can be formed as a locking member for locking the cover onto the arm support. This arrangement obviates the need for providing a separate dripping guide member, permitting improved versatility of a member.

Furthermore, a plurality of the dripping guide members in accordance with the present invention can be formed, avoiding the link coupling portion.

According to another aspect of the present invention, there is provided a wiper device equipped with an arm support making up a wiper arm, and a cover that covers the arm support partly or entirely, wherein the arm support has a protuberance formed so that it protrudes sideways with respect to the arm support from a side edge of the arm support. This arrangement makes it possible to construct a cover that does not easily flex in a direction orthogonal to a lengthwise direction of the arm support, to provide the protuberance with a function for preventing the cover from falling off, and to also allow the protuberance itself to serve as a dripping guide passage for water reaching the protuberance.

DETAILED DESCRIPTION OF PREFERRED EMBODIMENTS

An embodiment in accordance with the present invention will now be described in conjunction with FIG. 1 through FIG. 9.

In the drawings, a wiper arm I that constitutes a wiper device provided in a vehicle has a conventional configuration in that the wiper arm 1 is constructed mainly by an arm support 2 attached to a body of the vehicle, an arm shank 3 that is supported by the arm support 2 via a pin shaft 2a (a portion BJ coupled to a blade) and is able to swing in a direction away from a window surface, an arm piece 4 that has its proximal end integrally attached to the arm shank 3 and has a wiper blade (not shown) for wiping a window surface attached to a distal end thereof, and a member such as an urging device 5 installed between the proximal end of the arm piece 4 and the distal end of the arm support 2.

A wiper shaft 6 swings or circularly moves in a forward direction and a reverse direction as it is driven by a wiper motor (not shown). A proximal end of a first sub support link 7 is integrally connected to the wiper shaft 6. A distal end of the first sub support link 7 is rotatably or pivotally coupled to a rear surface, which faces the window surface, of the proximal end of the arm support 2 via a pivot 7a. The pivotally coupled portion transmits a drive power from the wiper shaft 6 to the arm support 2 to cause the wiper arm 1 to swing for wiping. The pivotally coupled portion corresponds to the link coupling portion in the present invention, and is named as a first link coupling portion J1, which will be discussed in detail hereinafter. A distal end of a second sub support link 8 bent to substantially an L shape is rotatably or pivotally coupled via a pivot 8a, which is connected to the link, to a rear surface of the arm support 2 at a side of the distal end of the first link coupling portion J1. This link coupling portion, as in the case of the first link coupling portion J1, causes the wiper arm 1 to swing for wiping, and corresponds to the link coupling portion in the present invention; hence, the link coupling portion is denoted as a second link coupling portion J2 and will be discussed in detail hereinafter. Thus, the arm support 2 in this embodiment is provided with a total of two link coupling portions, namely, the first and second link coupling portions J1 and J2.

A proximal end of the second sub support link 8 is rotatably coupled to the vehicle or the body via a pivot 8b connected to the body to thereby connect, in an interlocked manner, the wiper shaft 6, the first sub support link 7, the arm support 2, and the second sub support link 8, thus making up a four-joint link mechanism.

Figure 1:
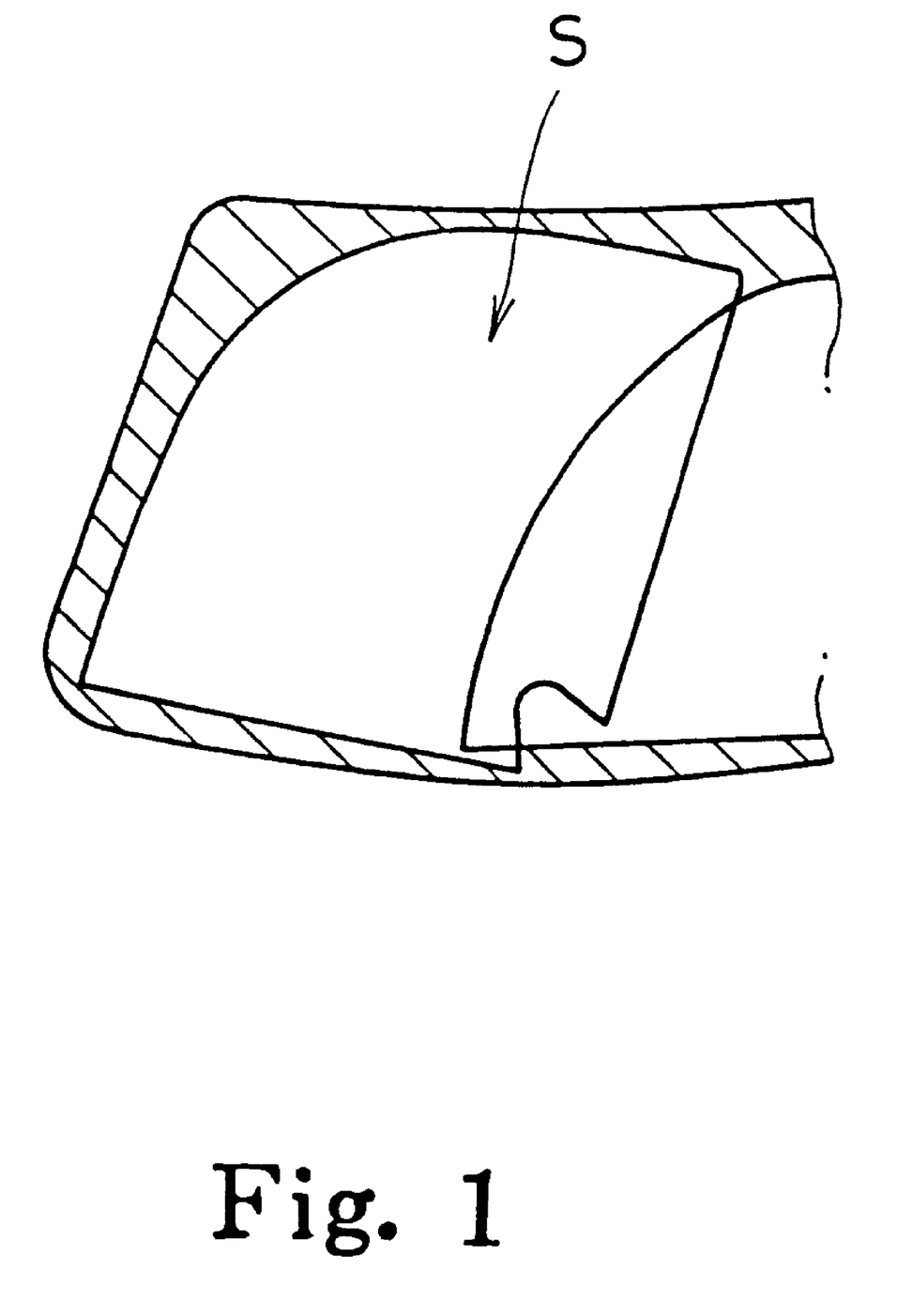
FIG. 1 is a partly omitted pattern diagram showing a wiping range of a wiper device.
Figure 2A:
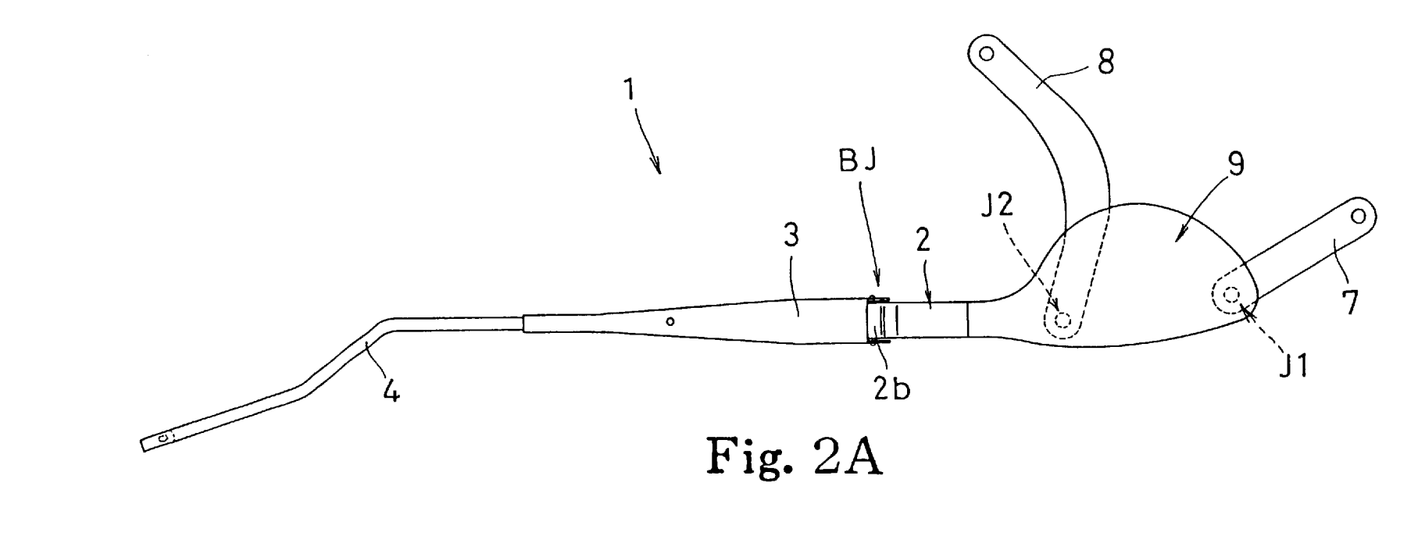
FIG. 2A and FIG. 2B are front view and a side view, respectively, of a wiper arm.
Figure 2B:
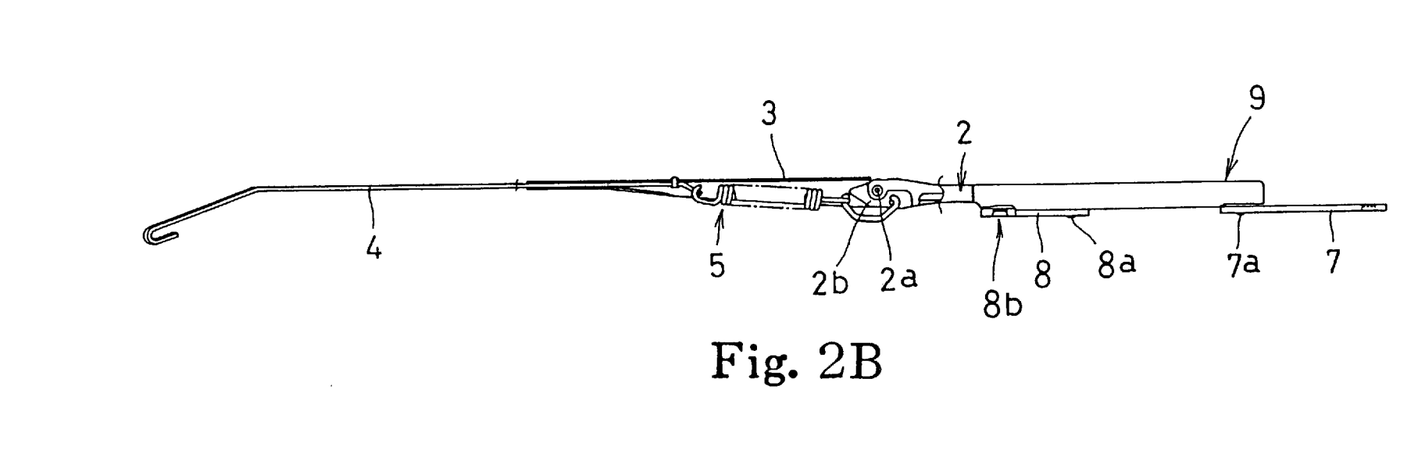
Figure 3A:
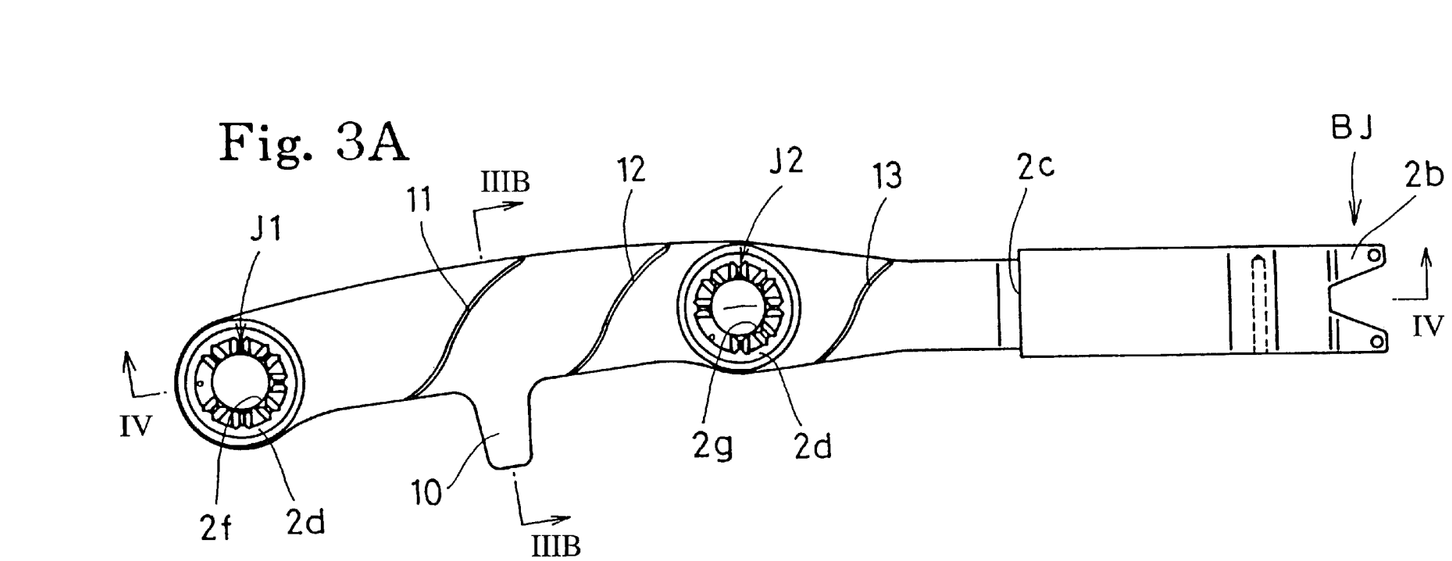
FIG. 3A is a front view of the arm support.
Figure 3B:
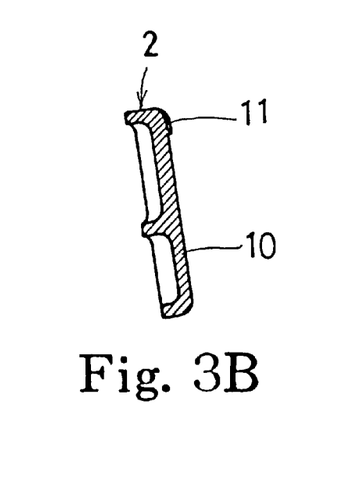
FIG. 3B is a sectional view taken at the line 3B—3B of FIG. 3A.
Figure 4:
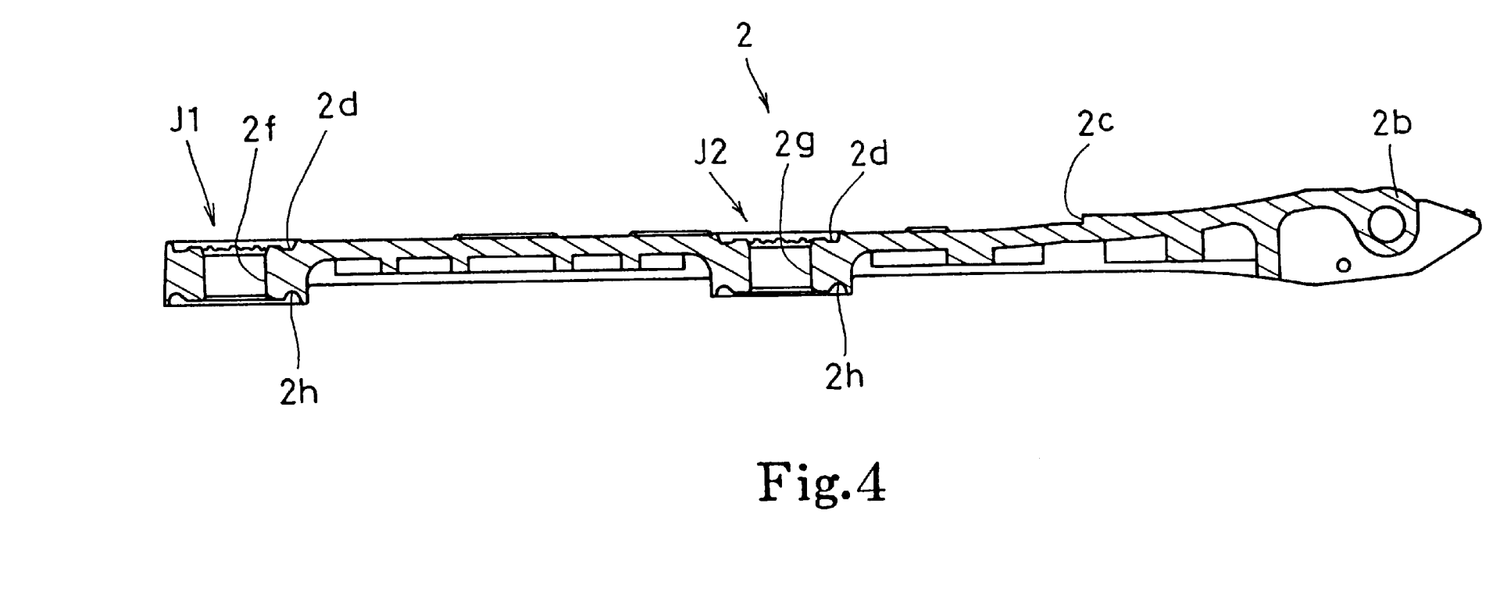
FIG. 4 is a sectional view taken at the line 4—4 of FIG. 3A.
Figure 5:
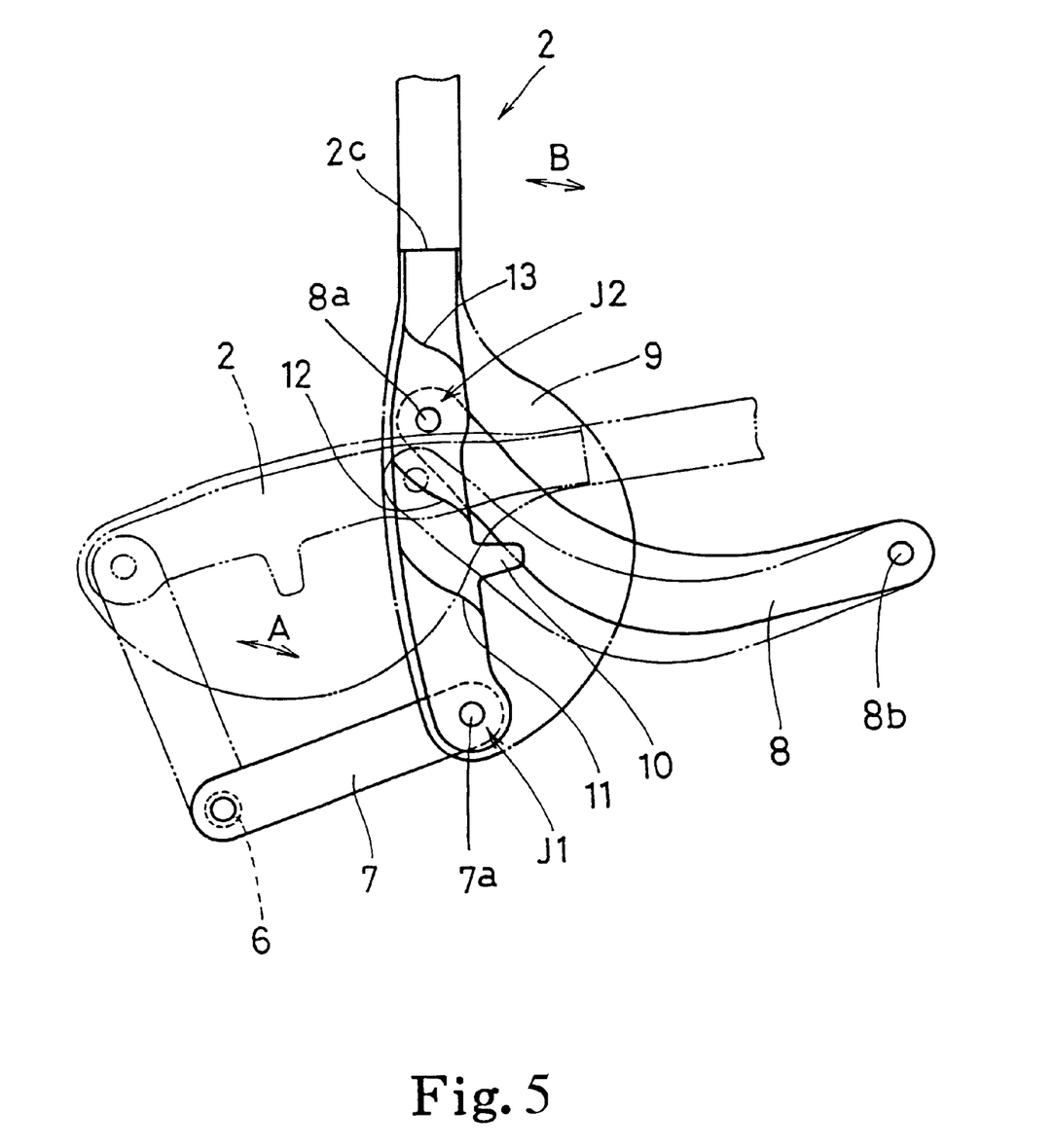
FIG. 5 is a pattern diagram illustrating a linking operation of the arm support.
Figure 6:
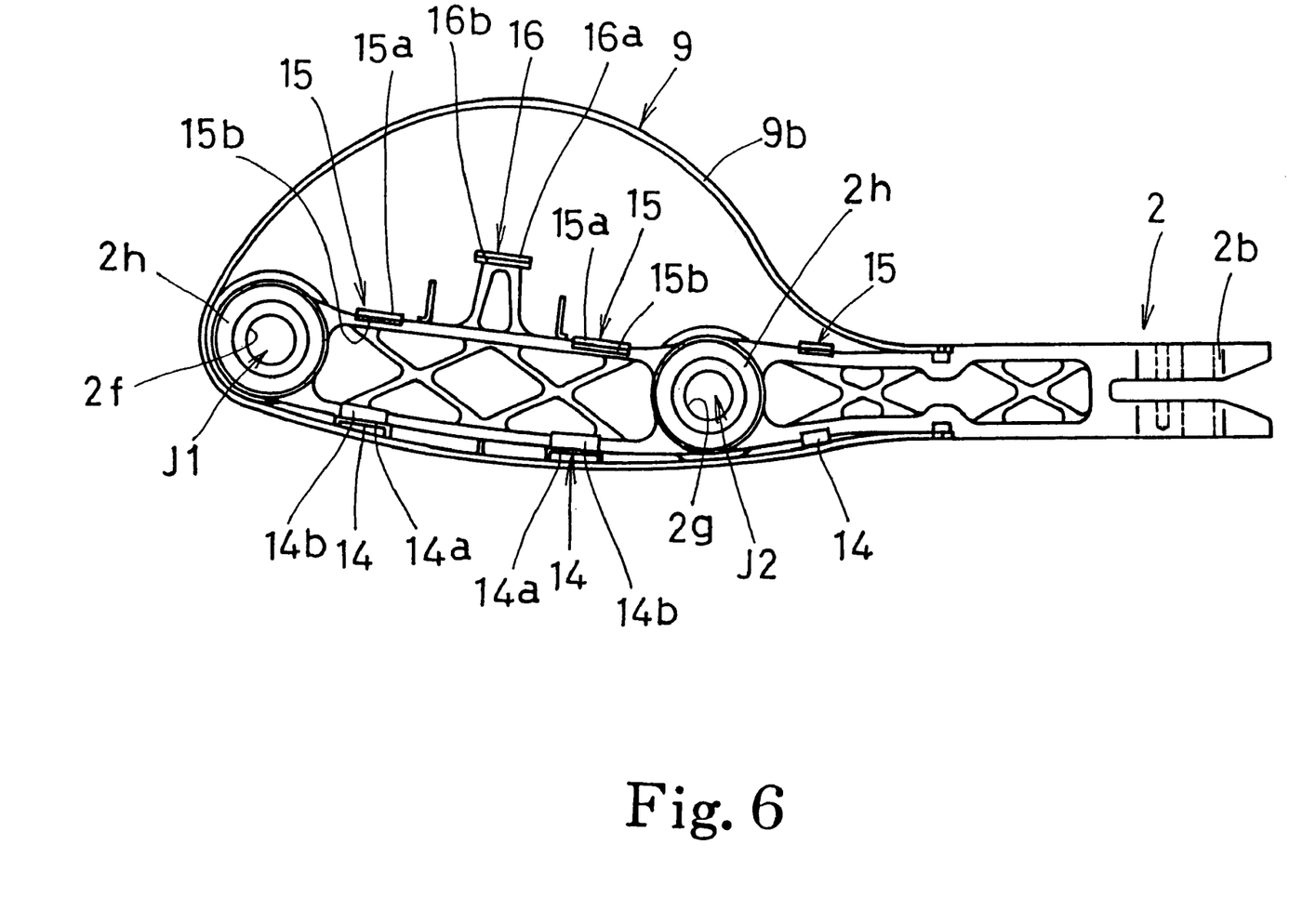
FIG. 6 is a rear view of the arm support with a cover attached thereto.
Figure 7A:
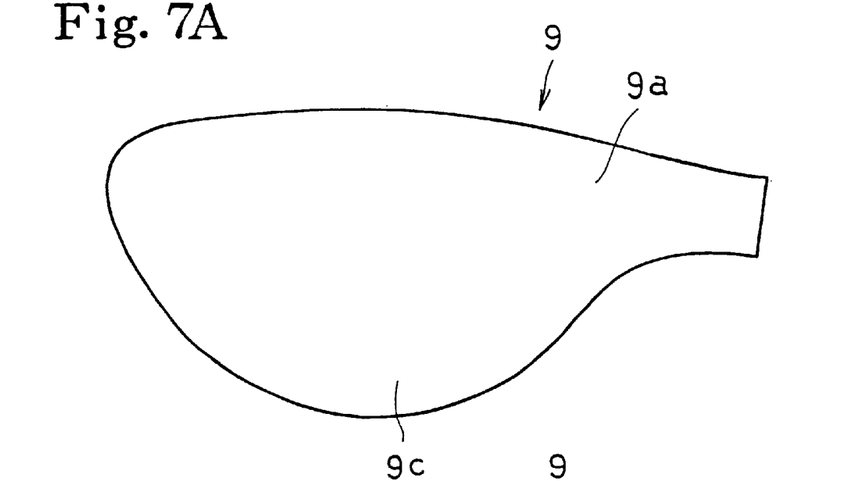
FIGS. 7A, 7B, and 7C are a front view, a bottom view, and a side view, respectively, of the cover.
Figure 7B:
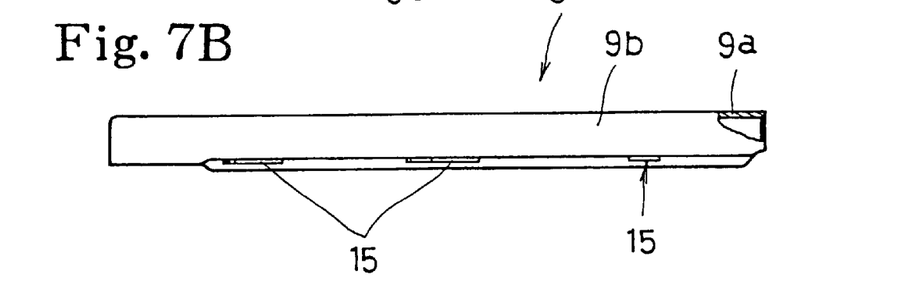
Figure 7C:
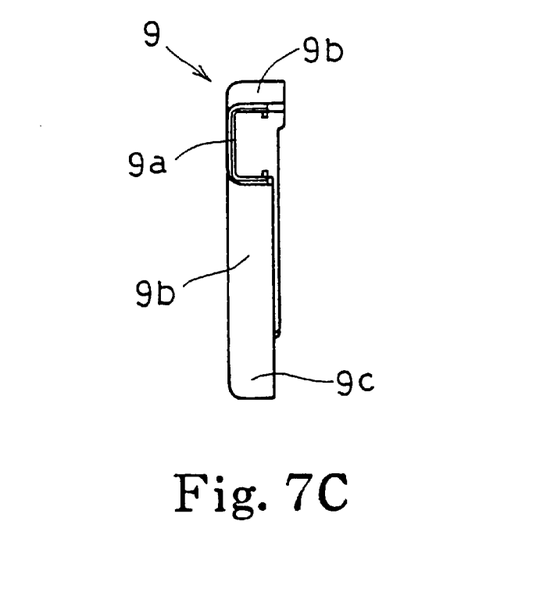
Figure 8A:
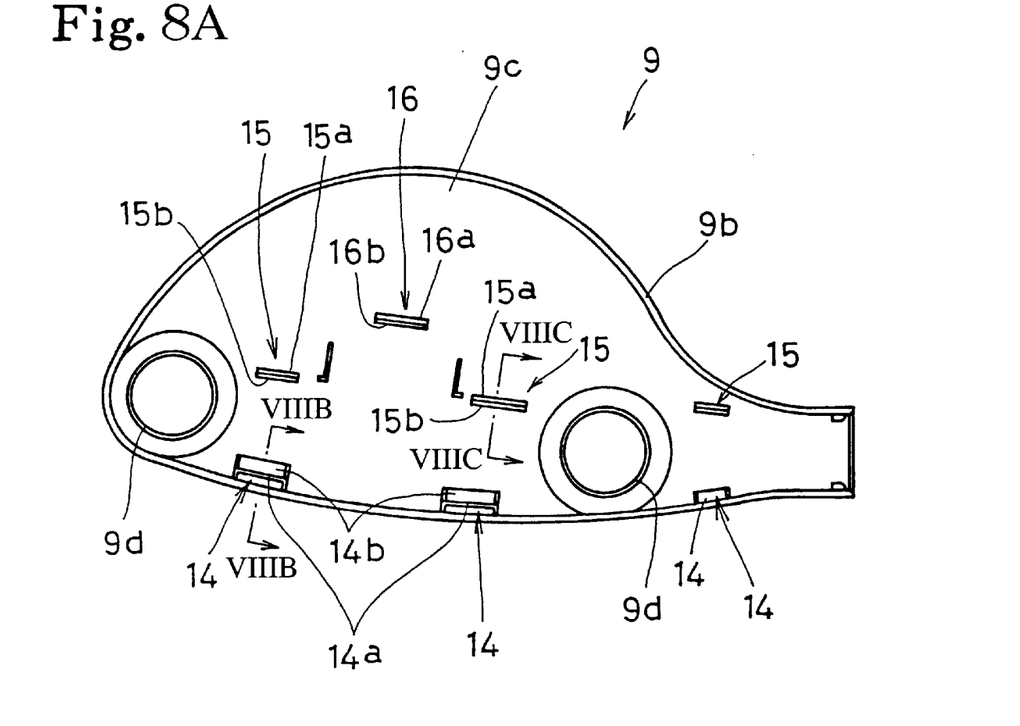
FIG. 8A is a rear view of the cover.
Figure 8B:
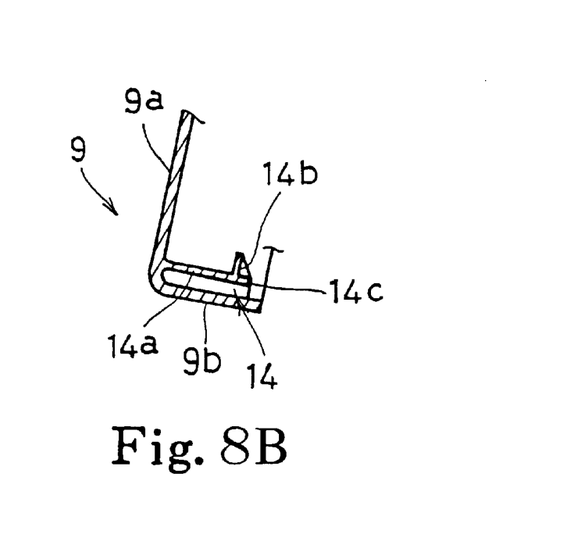
FIG. 8B is a sectional view taken at the line 8B—8 of FIG. 8A.
Figure 8C:
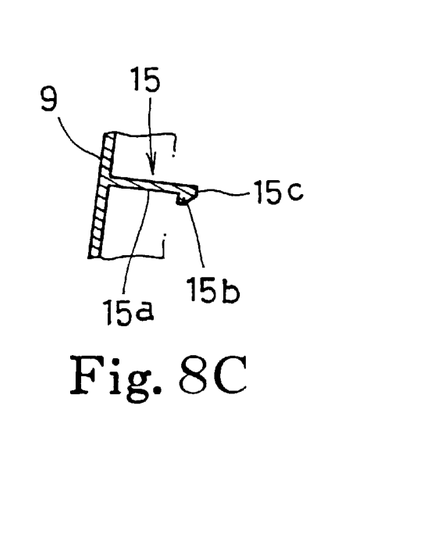
FIG. 8C is a sectional view taken at the line 8C—8C.
Figure 9:
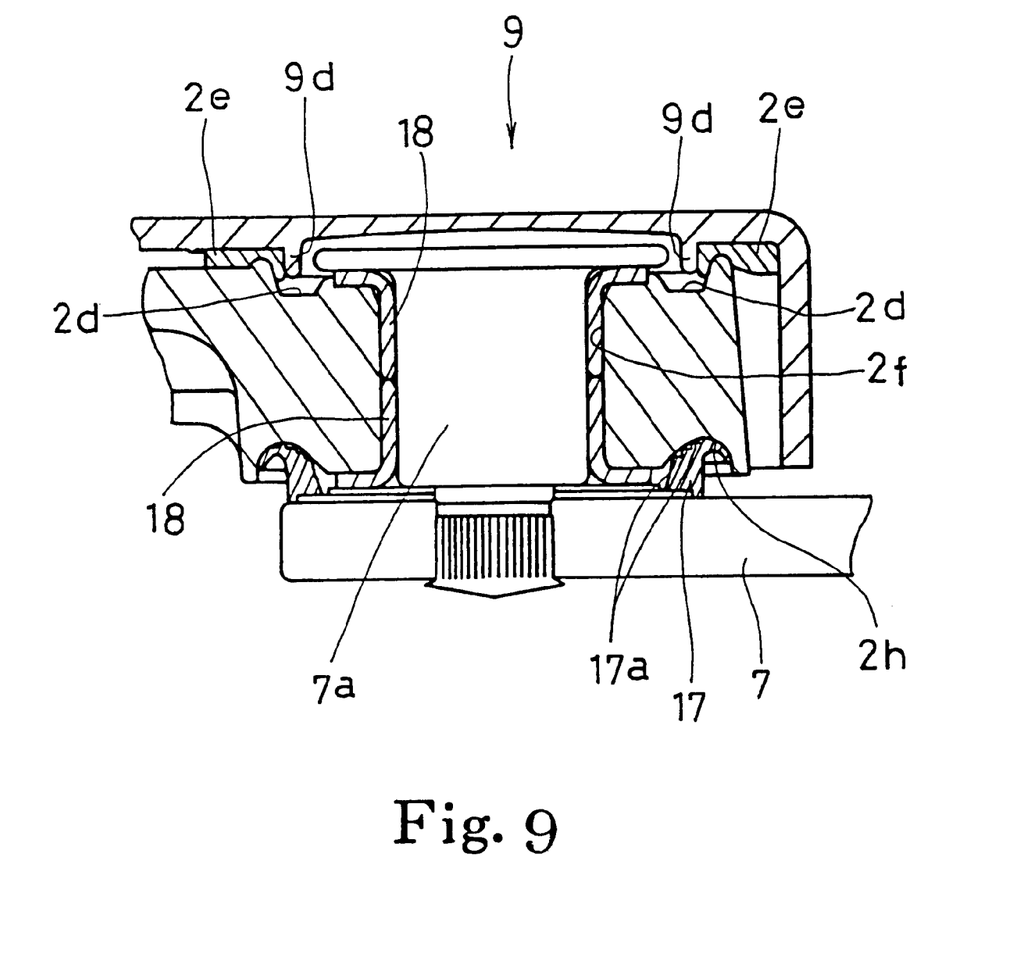
FIG. 9 is a sectional view of a first link coupling portion.

The four-joint link mechanism is arranged as follows. When the wiper shaft 6 is driven in the forward or reverse direction, the first sub support link 7 swings back and forth in a direction indicated by an arrow A shown in FIG. 5. This causes the arm support 2 or the wiper arm 1 to perform linkage movement together with the first and second sub support links 7 and 8, using the wiper shaft 6 and the pivot 8b of the second sub support link 8, which is connected to the body, as the pivoting points so as to swing back and forth in a direction indicated by an arrow B in FIG. 5. In this case, an arrangement is made so that the arm support 2 swings back and forth to be displaced upward to expand a wiping range S of the window surface wiped by the blade to a corner of the window surface as shown in FIG. 1, thereby increasing the wiping area. Referring to FIG. 5, the arm support 2 is set to swing back and forth between a lower reversal position indicated by a chain line and an upper reversal position indicated by a solid line.

The arm support 2 set forth above is equipped with a waterproof structure in accordance with the present invention. For an explanatory convenience in describing the waterproof structure of the arm support 2, the description will be made based on a positional relationship wherein the arm support 2 is positioned at the upper reversal position, and the blade coupling portion BJ, and the first and second link coupling portions J1 and J2 are vertically aligned.

The arm support 2 is formed of a member that is vertically long, a plate surface thereof opposing the window surface. A proximal or lower end of the arm shank 3 is swingably supported, via the pin shaft 2a, by a support portion 2b formed at an upper or distal end of the arm support 2, thereby constituting the blade coupling portion BJ. The arm support 2 has stepped portions 2c between the blade coupling portion BJ and the first link coupling portion J1. The stepped portions 2c are formed on its surface excluding the rear surface, that is, a front surface and right and left side surfaces. A portion below the stepped portions 2c, namely, a proximal portion, is made thinner. A cover 9 according to the present invention is installed so that it is flush with the thinner portion to thereby cover the first and second link coupling portions J1 and J2 of the arm support 2 by the cover 9 from the front side, thus waterproofing the thinner portion.

Furthermore, on a right side surface of the arm support 2 shown in FIG. 5, an arm-shaped protuberance 10 according to the present invention that is located between the first and second link coupling portions J1 and J2 and projects rightward or to the lower reversal position is integrally formed.

On the front surface of the thinner portion or the front surface of the portion covered by the cover 9, a first guiding passage 11 and a second guiding passage 12 are integrally formed so that they are vertically arranged between the first and second link coupling portions J1 and J2. A third guiding passage 13 is also integrally formed above the second link coupling portion J2. These first, second, and third guiding passages 11, 12, and 13 are respectively formed by ribs integrally formed to protrude outwardly across the surface of the arm support 2. All the guiding passages 11, 12, and 13 are formed such that they slope from left down to right so that their ends closer to the upper reversal position are higher, while their ends closer to the lower reversal position are lower, and that they also gently curve in an S shape.

The cover 9 is provided with a front surface portion 9a and a side surface portion, forming a circumferential skirt, 9b, which protrudes toward a rear surface from an outer periphery of the front surface portion 9a excluding an upper edge thereof, to cover the front surface of the arm support 2. The front surface portion 9a has, on its right side, a bulging portion 9c to cover the proximal end of the arm support 2 and the arm-shaped protuberance 10. An inner surface or a rear surface of the front surface portion 9a further has a plurality of locking hooks that are integrally formed for fitting the cover 9 onto the arm support 2. A total of seven locking hooks are formed along right and left side surfaces of the proximal end of the arm support 2. Three pairs of locking hooks 14 and 15 (paired laterally) are arranged in a lengthwise direction of the arm support 2, and a locking hook 16 are formed along a protuberant end of the arm-shaped protuberance 10. The locking hooks 14, 15, and 16 respectively are formed of proximal ends 14a, 15a, and 16a projecting toward the rear surface, and hooks 14b, 15b, and 16b at their distal ends. The locking hooks 15 formed along the right side surface of the arm support 2 are positioned so that their distal ends 15c do not interfere with linkage movement by coming in contact with the first and second sub support links 7 and 8 pivotally coupled on the rear surface of the arm support 2.

A cover side surface portion 9b, a part of the circumferential skirt, near the upper reversal position (a left portion thereof) is adjacent to the locking hooks 14, and its length from its front to rear is set to be longer than the distal end 14c of the locking hook 14b so that the side surface portion, or circumferential skirt, 9b juts out to the rear surface beyond the distal end 14c to thereby enhance the waterproof feature. A cover side surface portion 9b, also a part of the circumferential skirt, near the lower reversal position (a right portion thereof) is set to have a dimension that is smaller than the length from the front to rear of the aforesaid portion near the upper reversal position so that the distal end of the cover side surface portion, or circumferential skirt, 9b does not interfere with the linkage movement of the first and second sub support links 7 and 8 pivotally coupled on the rear surface of the arm support 2.

The cover 9 is installed by fitting the locking hooks 14 on the left portion thereof to the left portion of the arm support 2, and by pushing proximal ends 15a and 16a of the locking hook 15 on the right portion and the locking hook 16 facing the arm-shaped protuberance 10 to a right side of the arm support 2 while elastically deforming the proximal ends 15a and 16a. This causes the hooks 14b, 15b, and 16b to reach and engage the rear surface of the arm support 2 to thereby fit the cover 9 onto the arm support 2. At this time, the cover 9 engages the side surfaces of the arm support 2 by the locking hooks 14 and 15 and also engages the distal end of the arm shaped protuberance 10 by the locking hook 16.

With this arrangement, the cover 9 is supported at a plurality of points in the lengthwise direction of the arm support 2 and also supported by the arm-shaped protuberance 10 positioned to be substantially orthogonal to tracks connecting the foregoing plural supporting points, thus making the cover 9 resistant to flexure in a direction orthogonal to the arm support 2. This ensures further reliable prevention of the cover 9 from falling off.

On the inner surface of the cover 9, annular ribs 9d are integrally formed at positions facing against the first and second link coupling portions J1 and J2. The ribs 9d are adapted to fit, via sealing members 2e, in front surface annular recessed portions 2d formed in the surfaces of the wiper shaft coupling portions J1 and J2 when the cover 9 is fitted onto the arm support 2, as will be described hereinafter.

Of the locking hooks 14, 15, and 16, the locking hooks 15 formed along the right side surface of the arm support 2 are disposed to face the right edges of the first, second, and third guiding passages 11, 12, and 13, which are formed on the arm support 2 and which slope from the left down to the right, when they are fitted to the arm support 2. With this arrangement, water guided by the guiding passages 11, 12, and 13 is led toward the window surface or the rear surface along the proximal end 15a of the locking hooks 15 located further to the right than the guiding passages 11, 12, and 13. The guided water is drained toward the window surface by dripping from the distal ends 15c of the hooks 15b that jut out toward the window surface beyond the rear surface of the arm support 2. Thus, the locking hooks 15 serve also as dripping guiding members in the present invention. Furthermore, the water that has reached the arm-shaped protuberance 10 drips from a distal end 16c of the hook 16b of the locking hook 16 that engages the arm-shaped protuberance 10. Thus, the arm shaped protuberance 10 having the function for preventing the cover 9 from falling off is adapted to serve also as a guiding passage, so that water guided by the arm-shaped protuberance 10 is further led by the locking hook 16 functioning as a dripping guide passage and drained toward the window surface.

Dimensions of the cover 9 are set so that the front surface portion 9a of the cover 9 becomes flush with an outer front surface of the arm support 2, which is near an upper end thereof, when the cover 9 is mounted on the thinner portion formed by the presence of the stepped portions 2c of the arm support 2.

The waterproof structures of the first and second link coupling portions J1 and J2 will now be described. As previously described, the water that has entered between the arm support 2 and the cover 9 is guided through the first, second, and third guiding passages 11, 12, and 13, and drips outside via the cover locking hooks 15 and 16. If water still flows toward the first and second link coupling portions J1 and J2 or flows from the rear surface side or the window side, then the following waterproof structure applies.

The proximal end of the arm support 2 has through holes 2f and 2g that penetrate from the front to the rear thereof. The first and second sub support links 7 and 8 integrally attached to the pivots 7a and 8a are rotatably coupled to the arm support 2 by rotatably installing the pivots 7a and 8a in the through holes 2f and 2g, thus constructing the first and second link coupling portions J1 and J2. The first and second link coupling portions J1 and J2 of the arm support 2 share the same configuration; therefore, detailed descriptions will be given only of the first link coupling portion J1, omitting the description of the second link coupling portion J2.

Reference numerals in the drawings will be based on those of the first link coupling portion J1.

The front surface annular recessed portion 2d is provided in an outer periphery on the front surface of the arm support through hole 2f, a predetermined distance being provided from an edge of the hole. As previously mentioned, the annular rib 9d of the cover 9 is fitted, together with the sealing member 2e, in the surface annular recessed portion 2d to thereby provide the front surface of the arm support 2 with the waterproof feature.

A rear surface recessed portion 2h having a semispherical bottom is formed, with the semispherical bottom facing toward the front side, in an outer periphery of a rear surface of the arm support through hole 2f, a predetermined distance being provided from an edge of the hole. A proximal end of a trumpet-shaped sealing member 17 having its distal end diverging like a trumpet facing the arm support rear surface recessed portion 2h is integrally secured to a coupling portion of the first sub support link 7. The trumpet-shaped sealing member 17 is formed so that, when the first sub support link 7 is installed to the arm support 2, the distal end of the trumpet-shaped sealing member 17 is pushed in the rear surface recessed portion 2h and the distal end of the trumpet-shaped sealing member 17 is fitted by being elastically deformed so as to be in close contact with the bottom surface of the semispherical rear surface recessed portion 2h. This arrangement prevents entry of water from the rear surface side of the arm support 2. A plurality of annular ribs 17a are formed on an inner cylindrical surface of the trumpet-shaped sealing member 17. When the distal end of the sealing member 17 is elastically deformed to be in close contact with the rear surface recessed portion 2h, distal ends of the ribs 17a are abutted against the rear surface recessed portion 2h.

Reference numeral 18 denotes a bushing with a pair of jaws that is disposed between the pivot 7a and the arm support through hole 2f.

In the embodiment according to the present invention configured as set forth above, when the wiper shaft 6 swings or circularly moves in a forward direction and a reverse direction as it is driven by a wiper motor (not shown), the wiper arm 1 swings for wiping in a manner that it is vertically displaced on a window surface. This causes a wiper blade to wipe the window surface. In this case, a first-step waterproof means is accomplished by the cover 9 that covers the front surface and side surface portions of the first and second link coupling portions J1 and J2 of the arm support 2.

Moreover, in the embodiment, the front surface of the arm support 2 is provided with the first, second, and third guiding passages 11, 12, and 13 that are formed above the first and second link coupling portions J1 and J2. Hence, even if water flows down toward the arm support 2 as the wiper arm 1 moves to the upper reversal position and enters between the cover 9 and the arm support 2, the water that has entered is guided to the right end of the arm support 2 by the first, second, and third guiding passages 11, 12, and 13. This prevents the water from reaching the first and second link coupling portions J1 and J2, thereby protecting the first and second link coupling portions J1 and J2 from the water.

In addition, the cover locking hooks 15 are disposed at the right end side of the guiding passages 11, 12, and 13 such that they oppose to one another. Hence, water guided to the right end of the arm support 2 is led toward the window surface along the proximal ends 15a and 16a of the locking hooks. The guided water moves via the distal ends 15c and 16c of the locking hooks that protuberantly positioned on the rear surface of the arm support 2, and the water is positively drained outside from the rear surface or the window surface. This provides a second-step waterproof means.

Moreover, in the embodiment, the front surfaces of the first and second link coupling portions J1 and J2 are waterproofed by fitting the annular rib 9d of the cover, together with the sealing member 2e, in the front surface annular recessed portion 2d formed around the through hole 2f. The rear surfaces of the first and second link coupling portions J1 and J2 are waterproofed by installing the trumpet-shaped sealing member 17 in the semispherical rear surface recessed portion 2h. Thus, a third-step waterproof feature is provided, permitting a further reliable waterproof structure to be accomplished.

In addition, the waterproof of the rear surfaces of the first and second link coupling portions J1 and J2 can be enhanced by installing the distal end of the trumpet-shaped sealing member 17, which is disposed near the first sub support link 7, in the semispherical rear surface recessed portion 2h by elastically deforming the distal end so that it comes in close contact with the bottom surface of the recessed portion 2h to thereby ensure enhanced sealing performance. Furthermore, the plurality of annular ribs 17a formed on the inner cylindrical surface of the trumpet-shaped sealing member 17 add to the sealing performance, permitting reliable waterproof to be achieved.

Thus, as a result of providing the embodiment in accordance with the present invention with the waterproof structure as described above, even if the wiper arm 1 reaches the upper reversal position where it is oriented vertically, water will not flow to the first and second link coupling portions J1 and J2 vertically disposed. This arrangement enables the first and second link coupling portions J1 and J2 to be protected against water with resultant improved durability, leading to a higher reliability of the product.

Obviously, the present invention is not limited to the embodiment described above. For example, the guiding passages may alternatively be formed on the inner surface of the cover. Furthermore, the guiding passages formed on the surface of the arm support may alternatively be formed in semicircular shapes along the link coupling portions or linearly formed, avoiding the link coupling portions. As another alternative, the protuberant ribs in the above embodiment may be replaced by trough-shaped recessed portions.

What is claimed is:

1. A wiper device, comprising:
   an arm support constituting a wiper arm; and
   a cover that at least partly covers the arm support, wherein at least one of the arm support and the cover is provided with guiding means for guiding water that enters between the arm support and the cover at least across the surface of the arm support, the guiding means extending from a front edge to a rear edge of the arm support.

2. The wiper device according to claim 1, wherein
   the arm support has a link for the wiper arm to swing for wiping, the link being pivotally coupled thereto, and
   the guiding means are a guiding passage for guiding water across a surface of the arm support so as to avoid a link coupling portion, and a dripping guide member for guiding and dripping the water on the surface from the arm support to a rear surface thereof.

3. The wiper device according to claim 2, wherein the dripping guide member is a locking member for locking the cover onto the arm support.

4. The wiper device according to claim 3, wherein a plurality of dripping guide members are formed such that they avoid the link coupling portion.

5. The wiper device according to claim 2, wherein plurality of dripping guide members are formed such that they avoid the link coupling portion.

6. The wiper device according to claim 1, wherein the arm support has a protuberance formed so that it protrudes sideways from a side edge of the arm support.

7. A wiper device, connected to a motor and a vehicle via a pair of support links, the wiper device comprising:
   an arm support pivotally connected at one end to a first support link of the pair of support links and at an intermediate portion pivotally connected to a second support link of the pair of support links; and
   a cover removably attached to the arm support at a side away from the vehicle, wherein the arm support has at least one water directing element traversing the arm support proximate each support link to channel water away from the support link, each water directing element descends from a front edge to a rear edge of the arm support.

8. The wiper device according to claim 7, wherein the at least one water directing element is one of a rib and a channel traversing the arm support at an oblique angle when the arm support arm is vertical.

9. The wiper device according to claim 7, wherein the arm support has an arm shaped protuberance extending between the pair of support links.

10. The wiper device according to claim 9, wherein the cover has a plurality of pairs of locking hooks extending from a cover surface facing the vehicle whereby the cover is snap fitted to the arm support.

11. The wiper device according to claim 10, wherein the cover further has a locking hook extending from the cover surface facing the vehicle for engaging the arm shaped protuberance.

12. The wiper device according to claim 11, wherein the cover has a circumferential skirt forming a side surface, the side surface away from the pair of support links having a length greater than the locking hooks so as to completely cover the arm support and the side surface at the pair of support links having a length less than or equal to the locking hooks to avoid contact with the pair of support links.

13. The wiper device according to claim 7, wherein the cover has a plurality of pairs of locking hooks extending from a cover surface facing the vehicle whereby the cover is snap fitted to the arm support.

14. The wiper device according to claim 13, wherein the cover has a circumferential skirt forming a side surface, the side surface away from the pair of support links having a length greater than the locking hooks so as to completely cover the arm support and the side surface at the pair of support links having a length less than or equal to the locking hooks to avoid contact with the pair of support links.

15. The wiper device according to claim 7, wherein the pivotal connection between the first support link and the second support link to the arm support each includes:
   a hole in the arm support;
   a pivot received in the hole;
   an annular seal fixed to one of the support links and spaced from the pivot; and
   an annular recess in the arm support surrounding the hole on a side facing the vehicle, the annular seal seated in the annular recess.

16. The wiper device according to claim 15, wherein the pivotal connection between the first support link and the second support link to the arm support each includes:

a hole in the arm support;

a pivot seated in the hole; and an annular recess around the hole on a side away from the vehicle, the cover having an annular rib and an annular sealing member extending from a surface of the cover facing the vehicle, wherein the annular rib and at least a portion of the annular sealing member are received in the annular recess.

17. The wiper device according to claim 7, wherein the pivotal connection between the first support link and the second support link to the arm support each includes:

a hole in the arm support;

a pivot seated in the hole; and an annular recess around the hole on a side away from the vehicle, the cover having an annular rib and an annular sealing member extending from a surface of the cover facing the vehicle, wherein the annular rib and at least a portion of the annular sealing member are received in the annular recess.

18. A wiper device used on a vehicle with a linking mechanism having a pair of support links between the wiper device and the vehicle, the wiper device comprising:

an arm support having a hole at one end receiving a pivot of a first support link of the linking mechanism and a hole at an intermediate position receiving a pivot of a second support link of the linking mechanism; and a cover mounted to the arm support via a plurality of pairs of locking hooks extending from the cover to engage the arm support; and means for channeling water formed across a surface of the arm support facing to the cover, the means for channel water extends from a front edge to a rear edge of the arm support.

19. The wiper device according to claim 18, further comprising:

a pair of annular rings and sealing members extending from the cover and received in an annular recess surrounding each hole in the arm support.

20. The wiper device according to claim 19, further comprising an annular recess formed around each of the holes in the arm support on a side away from the cover, the annular recesses each receiving a seal mounted to the pivotally connected supporting link.

* * * * *